UNITED STATES PATENT OFFICE.

NATHANIEL C. FOWLER, JR., OF BOSTON, MASSACHUSETTS.

FOOD COMPOSITION AND METHOD OF MAKING THE SAME.

1,182,671. Specification of Letters Patent. Patented May 9, 1916.

No Drawing. Application filed June 23, 1914, Serial No. 846,888. Renewed April 3, 1916. Serial No. 88,722.

*To all whom it may concern:*

Be it known that I, NATHANIEL C. FOWLER, Jr., citizen of the United States, residing at Allston, Boston, in the county of Suffolk and State of Massachusetts, have invented new and useful Improvements in Food Compositions and Methods of Making the Same, of which the following is a specification.

This invention relates to improvements in food compositions and methods of making the same.

More particularly it relates to preparations of food adapted to be marketed as is now customary with cereals and breakfast foods, and it is a particular object of the invention to provide a compound food in such physical form as to keep for a very long period under exposure to ordinary conditions of climate without the aid of any added preservative ingredient. In this respect the invention avoids the use both of those chemicals whose deleterious character is a matter of debate, and of preservatives such as sugar and salt, and also avoids the necessity of sealing the food away from contact with the air.

The invention relates to subject matter in some respects similar to that to which the application for patent Serial No. 795,597, now pending in my behalf, relates; and the present invention may be considered as an improvement upon the particular product there described, in that it, by the addition of certain dry constituents extracted from milk, provides a food which may fairly be considered chemically and mechanically a perfect food for adults, containing both vegetable and animal elements, made from natural foods universally known and approved, obtainable at minimum cost, and capable of self-preservation for long periods of time notwithstanding exposure to the atmosphere and to climatic conditions of moisture.

Other features of the invention will appear from the description which follows, and from the appended claims, the purpose of which is to cover whatever features of patentable novelty exist in the invention disclosed.

The formulas by which the food of the invention may be made may be varied greatly, but the invention may be understood by using as an example a composition embodying the invention and made from fruit, corn, bran and milk. Either the process disclosed in the said pending application for patent or the modification of it disclosed in another of my applications for patent, Serial No. 846,889, may be used. In practising either of these processes corn meal and wheat bran may be mixed together with a small quantity of water, for example, water equal in weight to about one fourth of the weight of the total mixture of corn and bran, and subjected to heat in a covered vessel for a period of about twelve hours. This heat is preferably at a temperature of about the boiling point of water or a little above, and may be applied by steam, by which means uniform temperature may be maintained. A quantity of prunes, dried apples or other suitable fruit, preferably in a stage of dryness equivalent to the dryness of what is commercially known as prunes or dried apple, and about equal in weight to half of the weight of the combined corn and bran may be prepared by eliminating stones, seeds and other matter not wanted. Milk is prepared by eliminating the fat, by any suitable cream separating process or machinery, and by eliminating the water by any suitable evaporating process. The residue is a white powder. The fruit and the residue of the milk, thus prepared are then added to the corn and bran after their cooking as above described; and a small quantity of salt may be added for flavoring purposes, but it is to be understood that no salt is needed for assisting in any way in preserving the product. The whole mass is then to be thoroughly ground and mixed by suitable pulverizing machinery until the individual parts of each ingredient are very finely comminuted. It is essential to the perfection of the process and to the attainment of the desired self-preservative qualities of the product that this comminution be carried out to an exceedingly fine degree; and it is preferable that this portion of the process be carried out under pressure, if there be any ingredients containing oils, such as nuts or corn, in which case a glutinous substance expressed from the fruit becomes smeared over the particles of corn meal and incases them. This part of the process may be carried out with any suitable food grinding apparatus, one type which will serve as illustration being that of the common and well-known meat chopper in which an incased metallic worm feeds the material against a terminal perforated grinding and cutting surface, the product being rubbed, cut and ground on the interior surface of this plate, being continually under pressure from the action of the screw upon the mass behind, and being gradually pressed out through the perforations. The grinding may be carried out by passing the mass repeatedly through such a machine, or passing it through successive machines of graded degrees of fineness. When this has been accomplished the material may be spread thinly on pans or otherwise distributed so that it can be subjected to a thorough drying process by the aid of heat applied for a sufficient period to drive off the moisture with great completeness. Ordinarily a heat of a temperature of 225 degrees Fahrenheit, continued for three hours, will be sufficient for this, although the length of time requisite may depend in part upon the form in which the comminuted mass is; on whether the corn and bran and casein be coated with a glutinous product of the fruit or whether they be substantially uncoated; and on whether they be independent in their finely divided individual state, as products of infinitestimal size, or whether they are gathered and adhering together in small masses of granular form or otherwise. It is essential that the drying be very complete in either case. When thoroughly dried the product is ready for market or for use. It may be packed in any suitable vessels for storage and distribution as an article of commerce and will have the property of keeping for a very long period without deterioration, notwithstanding exposure to the air and to the moisture therein.

Efforts have heretofore been made to produce foods having long keeping qualities, but it has usually or always, except in the case of certain cereals, and except in the case of the said Fowler inventions, been necessary to keep such food away from access of the air in order to keep it from being spoiled. Cereals alone do not make a satisfactory all-around food. By the present invention an inexpensive but excellent animal protein product is combined with fruit and cereals in a perfectly balanced self-preserving food. In food made in accordance with the illustration herein given the fruit ingredient supplies those elements which are characteristic of fresh fruits in general and which are not available for the masses of people except in those times of the year when fruits are fresh and relatively inexpensive, and supplies them at a minimum of cost, by permitting the utilization of such varieties of fruits as may be preferred, or as may satisfy popular demand of taste, at whatever time of year and in whatever sections of the country these fruits are produced in superabundance and at lowest cost. In its physiological or dietetic aspect the fruit supplies carbo-hydrates and salines. The corn supplies starches, which are carbo-hydrates, and a variety of oil which is naturally so held in the corn that when treated by the processes described herein it does not become rancid. The wheat bran, which is the outer shell of the wheat kernel, supplies a mechanical stimulant and is rich in salines, such as phosphates and salts, the need for which is felt by men on shipboard in Arctic regions or in other places where food supply is scant, and for which lemon juice and orange juice are used as modern preventatives. The milk supplies protein of animal origin. In its natural state the food of the invention is in dry and somewhat gritty porous granular form, which when eaten is a strong stimulant to flow of saliva and is highly absorbent, so that when water is added, either by saliva or drink, the food meets all normal physiological requirements both chemically and mechanically.

Obviously the proportions of the different parts may be varied according to whatever is deemed wisest. Other grains and other fruits may be employed and in various proportions, but no preservative such as sugar or syrup or chemicals is required.

The product may be eaten in the prepared state as above described, or it may be eaten with the addition of cream or sugar or whole milk, or otherwise according to taste; or it may be used as a flour or ingredient with meal or with other proportions of grain or with other food ingredients for cooking.

As compared with whole milk, which is sometimes spoken of as a perfect food, it is to be observed that in the food of the invention the fats of the milk are removed in the cream, and in their place the fats and oil of the corn are combined with the protein of the milk. From this it follows first, that the protein of the composite food is obtained at a very low cost, because the cream constitutes by far the greater part of the commercial value of milk, and under the process of the invention the cream is wholly available for sale or for other use without the quality of the composite food being in any way depleted by the abstraction of the cream; and second, by the combination of a fat in the form of corn, or other grain or nuts, and the protein of milk in the form of a powder, a solid is obtained which is better suited to the dietetic needs of adults, and to their digestive apparatus, than is the liquid combination of fat and protein in milk.

I claim as my invention:

1. A process for preparation of foods consisting of grinding to a fine degree of comminution and mixing together cereal, fruit and proteid milk products, sterilizing and thoroughly drying the comminuted particles.

2. A process for preparation of foods consisting of the cooking of a cereal ingredient, the addition of a fruit ingredient, the addition of the residue of milk from which cream and water have been removed; the thorough mixing and grinding of the whole to a very fine degree of comminution; and subsequent drying of the comminuted material very thoroughly; all the ingredients being subjected to sterilizing heat at some time in the process.

3. A food composition including in combination cereal and fruit ingredients and the residue of milk from which the cream and water have been removed, the whole being very finely comminuted and dry.

4. A food composition consisting of a body of very finely comminuted material, sterile and dry, including fruit, corn meal, bran and protein of milk.

5. A food composition consisting of a body of very finely comminuted material, sterile and dry, including carbo-hydrates derived from fruit ingredients; starches, fats, salines and stimuli of peristalsis derived from cereal ingredients; and protein separated from other natural components of milk.

6. A food composition comprising a very finely comminuted mass of food materials, sterile and dry, including a fruit ingredient, and other ingredients derived from cereals and milk; the said fruit ingredient being in part arranged as a dry, hard, germ resisting envelop for the comminuted particles of other materials.

Signed by me at Boston, Mass., this 13th day of June, 1914.

NATHANIEL C. FOWLER, Jr.

Witnesses:
JOSEPH T. BEMAN,
EVERETT E. KENT.